United States Patent [19]
Morris

[11] 3,760,556
[45] Sept. 25, 1973

[54] APPARATUS FOR AUTOMATICALLY FORMING SQUARE MEAT LOAVES

[75] Inventor: Ervin E. Morris, Madison, Wis.

[73] Assignee: Jean Neesvig Manchester, Madison, Wis. ; a part interest

[22] Filed: July 1, 1971

[21] Appl. No.: 158,901

[52] U.S. Cl. ............... 53/122, 53/124 E, 141/71, 141/195, 141/283
[51] Int. Cl. ........................................... B65b 63/02
[58] Field of Search .................. 53/122, 124 E; 141/71, 195, 283

[56] References Cited
UNITED STATES PATENTS
2,553,684  5/1951  Soulen ............................... 141/195
3,593,484  7/1971  Dussich ........................ 53/124 E X
3,078,628  2/1963  Ready .............................. 53/122 X

*Primary Examiner*—Travis S. McGehee
*Attorney*—Oberlin, Maky, Donnelly & Renner

[57] ABSTRACT

Apparatus for extruding and packaging a ground meat product wherein the open end of the bag to be filled is clamped around the discharge end of a horn assembly mounted on the meat grinder. A longitudinally movable carriage resiliently engages the closed end of the bag to provide, in combination with the extruder, a loaf of uniform density. Means are provided for latching the carriage and shutting off the grinder when the carriage has traversed a predetermined position along the frame during the bag filling operation. The filled bag can then be closed and removed from the machine and an empty bag placed over the horn assembly for a subsequent filling operation.

8 Claims, 5 Drawing Figures

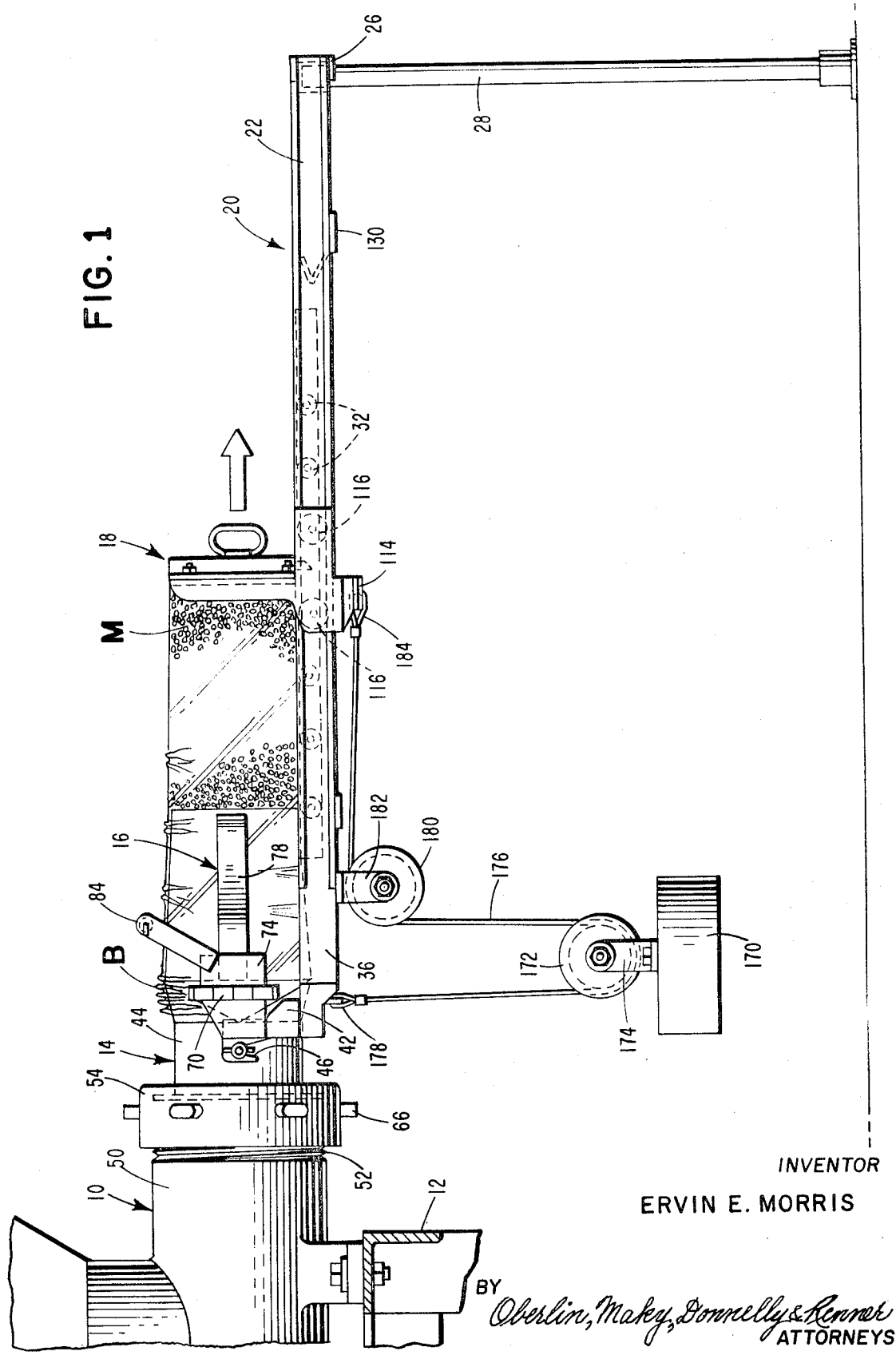

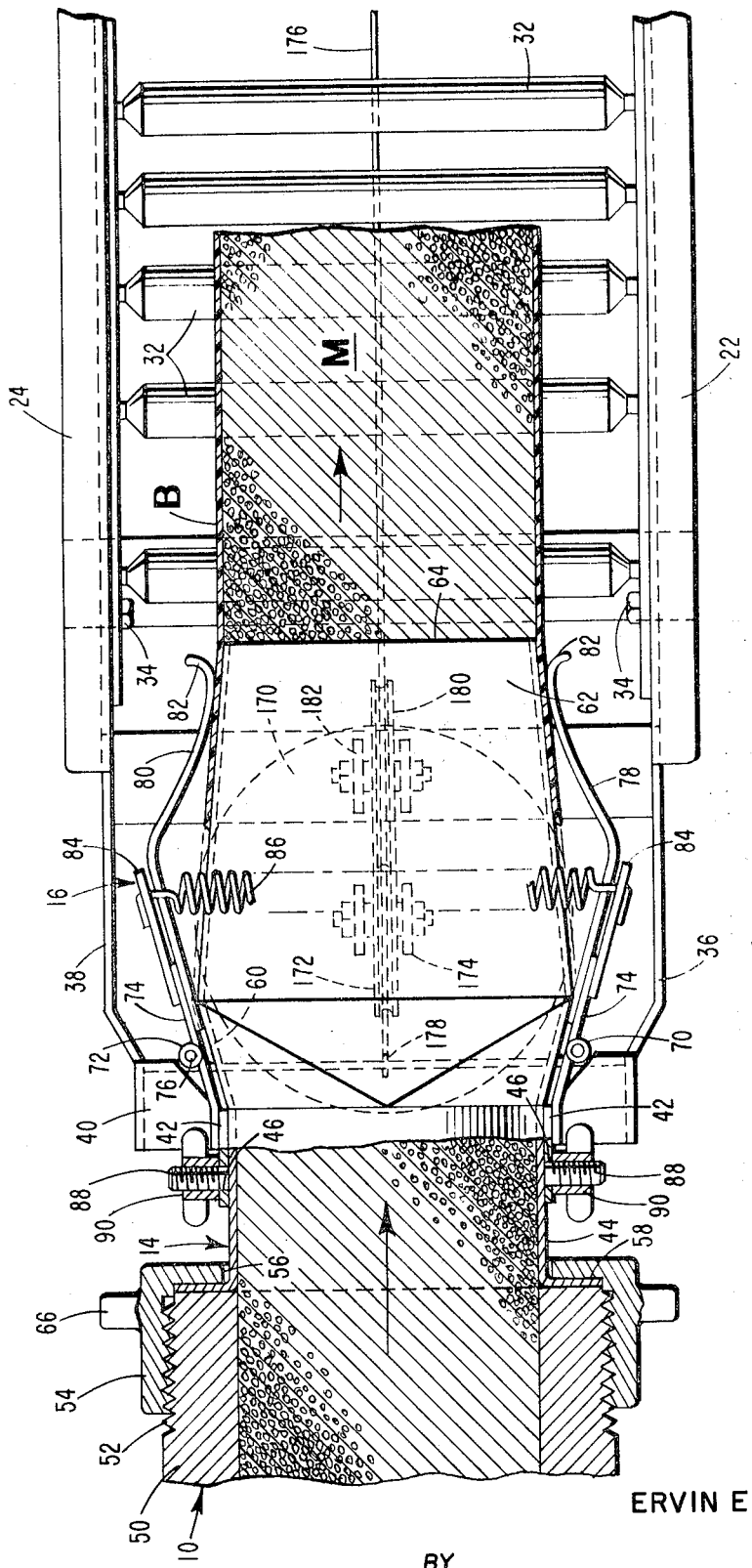

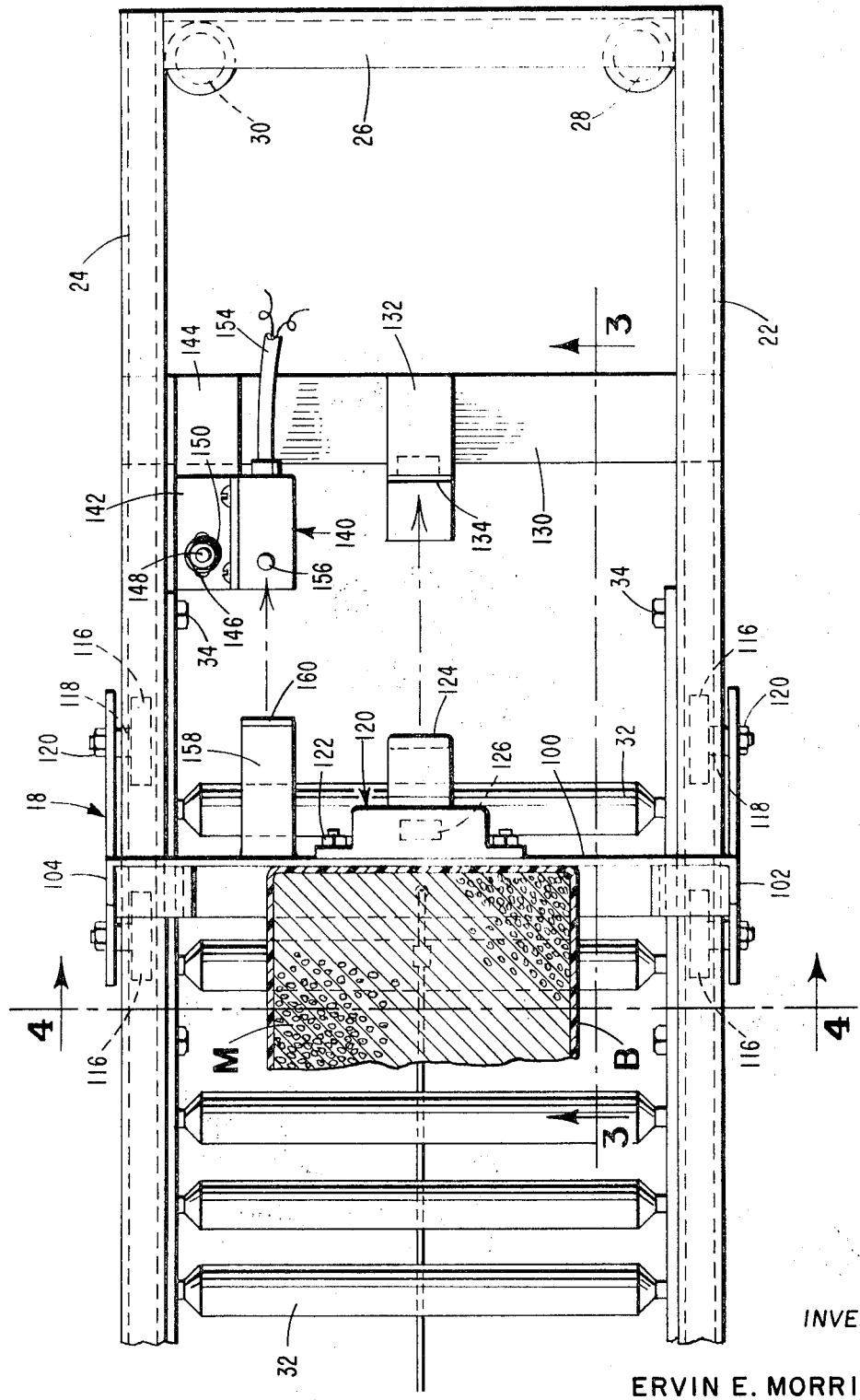

INVENTOR
ERVIN E. MORRIS

APPARATUS FOR AUTOMATICALLY FORMING SQUARE MEAT LOAVES

BACKGROUND OF THE INVENTION

The present invention relates as indicated to apparatus for automatically forming square meat loaves, and relates more particularly to apparatus wherein a square loaf of ground meat, for example, ground beef, can be formed of predetermined size, and thus weight.

The bulk packaging of ground meat products has in the past been comprised essentially of hand packing to a large extent. It is of course oftentimes desirable to pack the ground meat into relatively large packages, for example 10–15 pounds, and a typical packing operation comprises the hand packing of the ground meat into generally cylindrical loaves of the indicated weight.

Present packing methods are less than satisfactory for a number of reasons. First, the actual packing of the ground meat comprises a significant labor expense, and severely limits the amount of ground meat that can be packed in a particular unit of time. Secondly, is IS very difficult in hand packing to elminate the presence of significant amounts of air pockets thereby resulting in a relatively bulkier product for a given weight. Third, where the ground meat is packaged in bulk in essentially cylindrical form, the storage of these packages in stacked form results in significant wasted space due to the inherent inability to stack cylindrical objects in vertically oriented fashion without the presence of significant voids.

Although apparatuses have been developed for partially packing meat products, reference being made, for example, to U.S. Pats. Nos. 2,275,780; 3,134,681; 3,451,098 and 3,530,531, such apparatuses are characterized by their relative complexity and high costs, and their inability to totally meet or fulfill the desired objectives in connection with the bulk packing of ground meat materials.

SUMMARY OF THE INVENTION

With the above in mind, a primary object of the present invention is to provide apparatus in which ground meat product can be automatically packed in square loaf form of predetermined weight.

A further object of the present invention is to provide such apparatus wherein the ground meat product is extruded in square form by means of an extruder in which the ground meat is compressed as it is extruded thereby squeezing out to the extent possible the air created in the grinding operation and providing a loaf of generally uniform density throughout.

A further, more specific object of the invention is to provide an apparatus including carriage means which is mounted for reciprocal movement on the apparatus frame and which is adapted to engage the closed end of the container for the ground meat product and bias the same toward the extruder thereby serving to maintain the ground meat product in such compressed condition to maintain the uniformity of the product during the bag filling operation.

A still further object of the invention is to provide an apparatus in which the grinder is automatically shut off when the bag has been filled with a predetermined amount of ground meat as controlled by the position of the carriage, which is moved longitudinally on the frame as the ground meat is fed by the grinder through the extruder to the container. In accordance with the invention, when the carriage has reached a predetermined position of travel, which can be longitudinally adjusted, the carriage is latched in such position and a switch actuated to shut off the grinder, when the carriage is in such latched position, the bag can be released from its clamped position around the discharge end of the extruder, the open end tightly closed, and the filled bag removed from the apparatus for further handling. While the carriage is in such latched position, an empty bag can be placed in clamped position over the discharge end of the horn for a subsequent filling operation, and the carriage thereafter released and moved toward the extruder for engaging the closed end of the bag.

These and other objects of the invention will become apparent as the description proceeds in particular reference to the application drawings.

BRIEF DESCRIPTION OF THE DRAWINGS

FIG. 1 is a side elevational view of the apparatus according to the present invention, with the bag for the ground meat product being shown in partially filled condition;

FIG. 2A is a top plan view, partially in section, of the apparatus, shown during a bag filling operation;

FIG. 2B is a longitudinal continuation of FIG. 2A, illustrating the partially filled bag as the carriage is approaching its latched position;

DESCRIPTION OF THE PREFERRED EMBODIMENT

Figure 3:
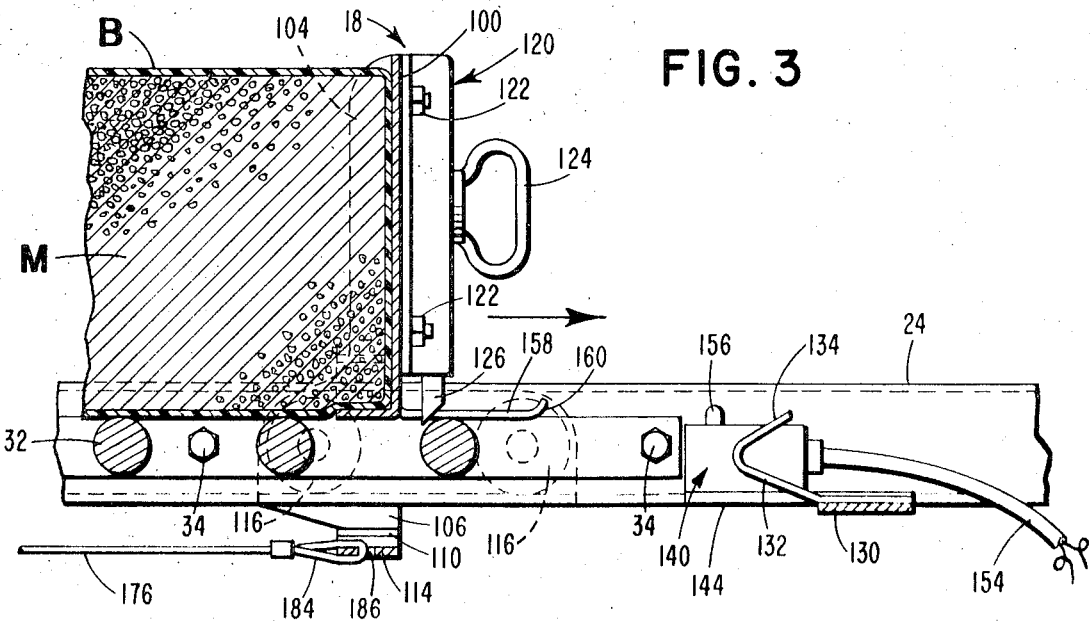
FIG. 3 is a sectional view taken on line 3—3 of FIG. 2B.

Referring now to the application drawings in detail, wherein like parts are indicated by like reference numerals, and initially to FIG. 1, a grinder of conventional construction is generally indicated at 10 and functions to grind meat fed thereto in a wellknown manner. The grinder can be supported at the desired vertical level by any suitable means such as frame 12.

The present invention comprises apparatus for attachment to the grinder 10 for automatically forming square ground meat loaves of predetermined weight, with the apparatus including a horn assembly generally indicated at 14, a bag clamping assembly generally indicated at 16, a carriage generally indicated 18, and at 18, supporting frame assembly generally indicated at 20.

The frame assembly 20 comprises channel shaped side frame members 22 and 24 and a transversely extending channel frame member 26 at the end of the frame remote from the grinder 10, most clearly shown in FIG. 2B. The transverse frame member 26 can be rigidly connected to the side frame members 22 and 24 in any suitable manner such as by welding or the like. Supporting legs 28 and 30 are rigidly mounted to the transverse frame member 26 for supporting the end of the frame assembly on the floor or like supporting surface.

A plurality of longitudinally spaced rollers commonly designated at 32 are rotatably mounted on the vertical portions of the channel frame members 22 and 24 for supporting the filled bag for rolling movement thereover toward the far end of the frame assembly. Referring to FIGS. 2A and 2B jointly, it will be noted that the spacing between the end most rollers and their immediate adjacent rollers is relatively greater thereby providing additional space in which to facilitate hand removal of the loaf from the rollers 32 at the completion of a filling operation.

The rollers 32 can be rotatably carried by the channel members 22 and 24 in any suitable manner. In the form shown, the rollers are provided in sections, with each section being mounted to the channel members by bolts commonly indicated at 34.

The side frame members 22 and 24 are welded or otherwise secured to frame extension members 36 and 38 of identical construction, with each such member including a horizontally extending intermediate section 40 and a vertical upper portion 42 positioned adjacent the exterior of the cylindrical portion 44 of the horn assembly 14. Each upper portion 42 is formed with a groove or notch 46 for removably mounting the apparatus on the horn assembly 14 which is in turn rigidly attached to the grinder 10 as will be hereinafter described.

Referring now to the construction and arrangement of the grinder 10 and horn assembly 14, the discharge end 50 of the grinder 10 is formed with external threads 52 for receiving a lock nut 54 which is generally cup-shaped and formed with a central axial opening 56. The horn assembly 14 comprises an inner, radially extending flange 58, the cylindrical section 44 previously referred to, an outwardly flared intermediate section 60, and an inwardly flared or tapered outlet section 62 which terminates in a discharge end 64 which is generally square in cross section.

The internal diameter of the cylindrical section 44 of the horn assembly is preferably the same as the internal diameter of the discharge end 50 of the grinder thereby to provide a smooth, uninterrupted discharge path for the ground meat, designated M. The flange 58 abuts the end face of the grinder, with the nut 54 serving to clamp such flange and thus the horn assembly to the grinder. A plurality of projections commonly designated at 66 are preferably provided for tightly securing the threaded engagement of the nut with the threaded end of the grinder.

By virtue of the unique shape of the horn assembly, the meat product M is transformed from a generally cylindrical loaf as it is discharged from the grinder into a generally square loaf as it is extruded at the end 64 of the horn assembly. The outward flaring of the intermediate portion of the horn assembly insures a squeezing or compression of the meat product as it passes to the discharge end 64 of the horn assembly thereby providing a finally discharged product that is uniform and relatively free of air.

Referring now to the bag clamping assembly 16, a pair of hinges 70 and 72 are welded or otherwise secured to the vertical upper portions 42 of the frame extensions 36 and 38. Each hinge 70 and 72 includes a movable hinge portion commonly designated at 74 which is hinged to the fixed hinge section by a hinge pin 76 in conventional manner.

Secured to each hinge arm 74 are clamping arms 78 and 80, respectively, the cross sectional configuration of which can be seen in FIG. 2A. The free end of each arm resiliently engages the bag or container B positioned over the horn assembly, with the extreme outer end of each clamping arm being outwardly turned as indicated at 82 to facilitate placement and removal of the bag from the horn assembly.

A pair of spring arms 84 are attached to each of the movable hinge arms 74, with each spring arm 84 being apertured to receive the opposed ends of coil spring 86, with the latter serving to resiliently bias the spring arms 84, and thus the movable hinge portions 74, toward each other. In this manner, the clamping arms 78 and 80 resiliently engage the bag B and clamp the same over the discharge end of the horn assembly 14. The force of the coil spring 86 is pre-selected to provide such bag clamping effect without at the same time preventing unfolding of the bag during the bag filling operation.

The frame and bag clamping assembly are mounted on the fixed grinder and horn assembly by means of studs 88 which are attached to and project outwardly from the sides of the cylindrical portion 44 of the horn assembly. The studs 88 are adapted to receive the notches 46 formed in the portions 42 of the frame extension members 36 and 38, with a sleeve nut 90 threadedly engaging the studs 88 for clamping the frame and bag clamping assembly in place. It will be seen that by loosening the sleeve nuts 90, the entire frame and bag clamping assembly can be lifted from the horn assembly for cleaning or reassembly with other meat grinding machines.

Figure 4:
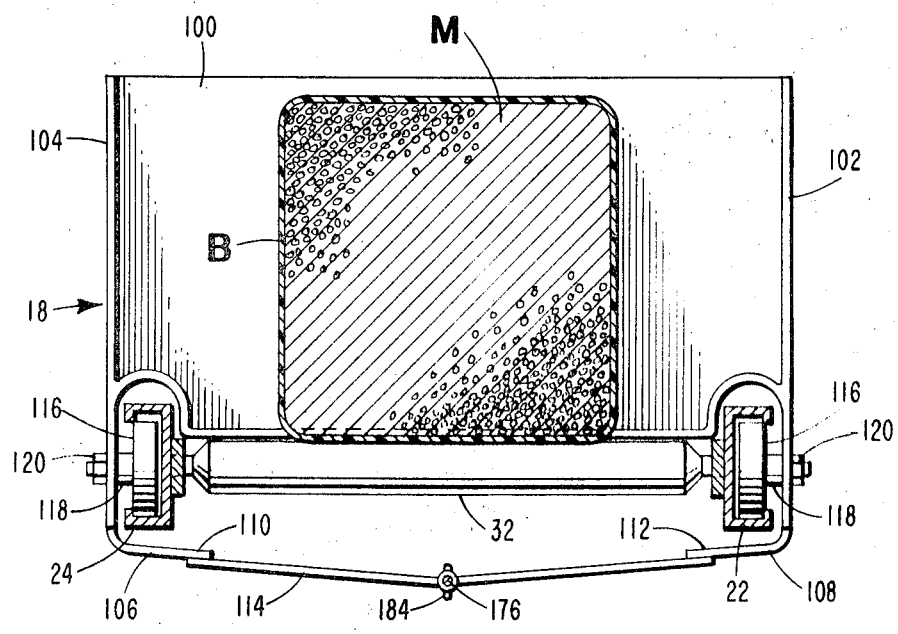
FIG. 4 is a sectional view taken on line 4—4 of FIG. 2B.

Referring now to the construction of the carriage 18 as best shown in FIGS. 3 and 4, the carriage comprises a vertically extending main section 100 and integrally formed side flanges 102 and 104 which extend normal to the main section 100 in the direction of the grinder. Integrally formed with the flanges 102 and 104 are stabilizer sections 106 and 108, respectively, which terminate in inwardly directed bottom flange portions 110 and 112 which extend beneath the carriage and the rollers 32. A strap 114 is secured to the ends of the flanges 110 and 112 and functions to receive means for biasing the carriage toward the grinder as will be hereinafter described.

A pair of rollers commonly designated at 116 are mounted on each of the stabilizer sections 106 and 108 by sleeves 118 and nuts 120, with the rollers 116 being positioned inwardly of the plane of the flanges 102 and 104 and within the channel defined by the side frame members 22 and 24 for rolling movement therealong. In this manner, the longitudinal movement of the carriage along the frame assembly is smooth and stabilized.

A latch generally indicated at 120 is mounted by bolt assemblies commonly designated at 122 on the main section 100 of the carriage, with the latch assembly including a latch handle 124 and latch pin 126. The latch pin is resiliently biased downwardly to the FIG. 3 position thereof by spring means or the like (not shown), with the latch handle 124 when rotated withdrawing the latch pin 126 to permit return of the carriage toward the grinder after the bag filling operation.

The frame of the apparatus further includes a transverse frame member 130 which extends between the side frame members 22 and 24 and on which is mounted approximately intermediate the ends thereof a cam stop member 132. As best seen in FIG. 3, the cam stop member 132 is of generally open U-shape, having a free end portion 134, the tip of which extends above the bottom of the latch pin 126 when the same is in its FIG. 3 position. As the carriage approaches the cam stop, the latch pin 126 will be cammed upwardly by the stop member and will pass therebeyond, after which the latch pin will be biased downwardly below the tip of the cam stop member thereby preventing movement of the carriage toward the grinder until the latch pin has been retracted as above described.

As above noted, switching means is provided for stopping the grinder when the carriage has moved to the latched position. Referring to FIGS. 2B and 3, a limit switch generally indicated at 140 is mounted on a bracket 142 which is adjustably mounted on plate 144 attached to the transverse frame member 130. The horizontal portion of the bracket is formed with an elongated slot 146 through which extends a bolt 148 which also extends upwardly through an opening therefor formed in the plate 144. A clamping nut 150 threadedly engages the bolt 148 for clamping the bracket 142, and thus the switch 140, in longitudinally adjusted position relative to the bracket 144.

The switch 140 per se is conventional and includes an electrical cord 154 which can be connected to a source of electrical power in normal fashion. The switch 140 further includes an upwardly biased actuating button 156 which extends into the path of travel of a switch actuating arm 158 carried by the carriage and extending from the main section 100 thereof in the direction of the path of travel of the carriage during the bag filling operation. The actuating arm 158 is provided with a upwardly turned, cam end 160 which is adapted to engage and cam downwardly the actuating button 156 when the carriage has reached a position where contact is established between the actuating button and arm. The switch 140 forms part of a circuit (not shown) which functions to shut off the grinder when the actuating button 156 has been depressed, thereby terminating the bag filling operation. The switch 140 is longitudinally positioned relative to the frame so that the switch is actuated at substantially the same time as the latch pin 126 rides over and behind the stop member 132 whereby the carriage is latched and the grinder is shut off to facilitate removal of the filled bag and replacement with an empty bag. The construction of the switch is such that the grinder is subsequently actuated by a second switch means, such as a foot pedal switch, when the carriage has been returned and an empty bag has been placed over the horn assembly.

As above noted, the carriage 18 is biased toward the grinder during the entire bag filling operation in order to squeeze out as much air as possible to provide a loaf of generally uniform density throughout. In the form shown, the carriage is biased by means of a weight 170 on the top of which is mounted a sheave 172, by a bracket 174. A rope or cable 176 is attached at one end 178 thereof to the fixed horn assembly and is trained around the sheave 172 and a second sheave 180 which is carried by a bracket 182 mounted on the bottom of the frame 20. As best seen in FIG. 3, the opposite end of the cable 176 is in the form of a closed loop 184 which extends through an opening 186 formed in the strap 114 of the carriage 120.

It will thus be seen that the weight 170 acts downwardly to continuously bias the carriage to the left, as viewed in FIGS. 1 and 3, thereby compressing the meat product as the same fills the bag B. The weight 170 is pre-selected so as to provide such bias during all periods of filling.

The manner of operation of the present invention should be apparent from the above description. To briefly summarize, a bag B is placed with its open end around the discharge end of the horn assembly 14, with the clamp arms 78 and 80 being spread to facilitate such placement and later released to resiliently clamp the bag in place. During placement of the bag over the horn, the carriage 18 is normally in its latched position.

The carriage is thereafter unlatched by withdrawing the latch pin 126 thereby permitting rolling movement of the carriage along the frame to a position closely adjacent the closed end of the bag B. The carriage remains in biased engagement with the closed end of the bag by virtue of the weight 170. The grinder is thereafter started by means of a foot pedal switch or the like (not shown) and the ground meat product M begins to fill the gab B. Due to the unique shape of the outlet section 62 of the horn assembly, the ground meat product is extruded from the discharge end 64 of the horn assembly in relatively compact condition and having a cross section which is generally square. Such compacting is maintained by the pressure of the carriage 120 under the bias of the weight 170.

The closed end of the bag B gradually unfolds during the filling operation, with the thus formed square loaf traversing the frame over the rollers 32 and carrying with it the carriage 18. As the bag B approaches its filled condition, the latch pin 126 engages the stop member 132 and is cammed upwardly thereby until the latch pin 126 has passed the cam end 134 of the stop member 132 thereby latching the carriage against movement toward the grinder. At substantially the same time, the actuating arm 160 engages and depresses the actuating button 156 of the switch 140 thereby terminating the grinder operation. With the carriage in latched position, the open end of the bag B can be removed from the discharge end of the horn assembly, closed and clipped or otherwise made secure. The loaf can than be removed from the apparatus by the operator and an empty bag placed over the horn assembly for a subsequent filling operation.

It will thus be seen that the present invention provides for the substantially automatic forming of square ground meat loaves. By achieving uniform density of the ground meat product in the bag, the weight of the filled bag can essentially be made dependent upon the length of the filled bag. The latching assembly and the limit switch for terminating operation of the grinder can as desired be longitudinally adjusted on the frame to provide filled bags of varying length and consequently varying weight.

I claim:

1. Apparatus for extruding and packaging a meat product, comprising:
   a. a frame,
   b. a horn assembly adapted to be removably mounted at the discharge outlet of a meat processing member, said horn assembly having an inner cylindrical section mounted adjacent the outlet of the meat processing member, an outwardly flared intermediate section substantially larger in cross section than said inner section thereby to permit expansion of the meat product as it passes therethrough, and an inwardly tapered outlet section the terminal portion of which is square in cross-section and substantially smaller in area than said intermediate section whereby said meat product is compressed and in square loaf form as it is discharged from said horn assembly, c. bag clamping means for clamping the open end of a bag to be filled around the discharge end of said horn assembly, d. means on said frame for supporting said bag as the same is filled by said meat product from said horn assembly, e. means including a carriage mounted for reciprocating movement on said frame, f. means for biasing said carriage into pressure engagement with the closed end of said bag thereby serving to compress said bag for uniform packing of said meat product, g. latching means for terminating the movement of said carriage during the bag filling operation when said carriage has reached a predetermined position wherein said bag is filled with a predetermined amount of said meat product, and h. switch means for shutting off said meat processing member when said carriage is in said latched position thereby permitting the filled bag to be removed and an unfilled bag to be placed over said horn assembly for a subsequent filling operation.

2. The apparatus of claim 1 wherein said bag clamping means comprises a pair of resilient spring arms pivotally mounted on either side of said horn assembly, said spring arms being operatively interconnected by spring means which urges said spring arms into resilient contact with said sides of said horn assembly thereby firmly clamping the open end of a bag placed over the discharge end of said horn assembly.

3. The apparatus of claim 1 wherein said frame is vertically supported above the floor to maintain said frame and the components supported thereby at a desired vertical working level, said frame comprising side frame members generally C-shaped in cross section to provide a channel for supporting said carriage for longitudinal movement.

4. The apparatus of claim 3 wherein said carriage includes a vertically oriented, flat, bag-engaging member and side stabilizer portions, with each of said stabilizer portions carrying at least two rollers disposed in the respective channels of said frame members thereby to support and stabilize said carriage during its reciprocal movement.

5. The apparatus of claim 4 wherein said latch means comprises a male latch member mounted on said carriage, and a fixed female member mounted on said frame, said male member engaging said female member when said carriage has been reached such predetermined position for latching the same in place.

6. The apparatus of claim 4 wherein said means for biasing said carriage into pressure engagement with the closed end of said bag comprises weight means operatively connected between said frame and said carriage, the force of said weight means biasing said carriage toward the closed end of said bag and said horn assembly.

7. The apparatus of claim 1 wherein said switch means comprises a limit switch mounted on said frame and a cooperating switch actuating member carried by said carriage, said switch actuating member when said carriage has reached such predetermined position closing said switch and shutting off said meat processing member, and further including second switch means for restarting said meat processing member when said filled bag has been removed and an empty bag has been placed in clamped arrangement around said horn assembly and said carriage has been unlatched and returned to a position adjacent said horn assembly.

8. The apparatus of claim 1 further including a plurality of rollers rotatably mounted on said frame, said rollers serving to support said bag for longitudinal movement as the same is filled with said meat product.

* * * * *